(12) United States Patent
Bagumyan et al.

(10) Patent No.: US 10,190,629 B1
(45) Date of Patent: Jan. 29, 2019

(54) ROTATING FORM

(71) Applicants: Sarmen Bagumyan, Sun Valley, CA (US); Arthur Bagumyan, Sun Valley, CA (US); Andranik Andy Bagumyan, Sun Valley, CA (US)

(72) Inventors: Sarmen Bagumyan, Sun Valley, CA (US); Arthur Bagumyan, Sun Valley, CA (US); Andranik Andy Bagumyan, Sun Valley, CA (US)

(*) Notice: Subject to any disclaimer, the term of this patent is extended or adjusted under 35 U.S.C. 154(b) by 0 days.

(21) Appl. No.: 15/787,636

(22) Filed: Oct. 18, 2017

(51) Int. Cl.
*A63G 31/12* (2006.01)
*F16C 32/06* (2006.01)

(52) U.S. Cl.
CPC .......... *F16C 32/0622* (2013.01); *A63G 31/12* (2013.01); *A63B 2225/62* (2013.01); *F16C 2316/30* (2013.01)

(58) Field of Classification Search
CPC .......... A63G 4/00; A63G 31/00; A63G 31/12; A63B 2225/60; A63B 2225/62; E04H 15/20; E04H 15/22

USPC .................. 472/134; 446/220–226
See application file for complete search history.

(56) References Cited

U.S. PATENT DOCUMENTS

| 7,267,851 | B2* | 9/2007 | Hsu | G09F 15/0025 |
| | | | | 428/12 |
| 7,514,171 | B2* | 4/2009 | Rainville | H01M 8/04037 |
| | | | | 429/434 |
| 2007/0072510 | A1* | 3/2007 | Hsu | G09F 15/0025 |
| | | | | 446/236 |

* cited by examiner

*Primary Examiner* — Kien Nguyen
(74) *Attorney, Agent, or Firm* — Michael N. Cohen; Cohen IP Law Group PC

(57) ABSTRACT

A structure generally comprising a support structure with a rotating form is disclosed. The support structure may be an upright tube or other shape, and the rotating form may be a ring or other shape configured with the tube. Holes may be in the outer circumference of the tube and in the inner circumference of the opening of the ring. Pressurized air may pass into the tube and out its holes, and then into the ring. In this way, the air may apply a lift to the ring and may minimize friction between the tube and the ring, thus allowing it to rotate freely.

12 Claims, 7 Drawing Sheets

ROTATING FORM

FIELD OF THE INVENTION

The current invention generally relates to a rotating form that may be a part of an inflatable attraction or play structure.

BACKGROUND OF THE INVENTION

Play structures such as inflatable bouncy houses or obstacle courses have existed for some time. These structures often include different types of obstacles and/or elements such as steps to climb, slides to slide down, blocks to jump over, rings to squeeze through, hanging obstacles to navigate, and other types of forms. In addition, many inflatable structures include games such as ball and hoop games and other types of games.

However, these inflatable structures have significant limitations in the area of freely rotating forms such as gates or rotating obstacles. For example, some inflatable play structures require an electric base motor to apply the rotational force to the rotating forms. This requires an electrical power source in addition to the gears and other mechanisms necessary for the form to rotate. Others require that the forms be rotated manually, and due to the friction involved, this may be difficult for smaller children.

As such, there continues to be a need for new and innovative play structure elements that introduce new types of rotating forms. For example, there is a need for a rotating form for use within an inflatable play structure that is able to rotate freely and easily.

SUMMARY OF THE INVENTION

In a first aspect of the invention, an apparatus is described that may include a base with a rotating element or form. The apparatus may be a component within a play structure such as an inflatable bouncy house or other type of structure. The base may generally comprise an inflatable upright element such as a cylindrical tube that may have small holes located around its circumference in certain locations. The rotating element may generally comprise an inflatable ring or other type of shape that may fit onto the tube. Small holes may also be in the inner wall of the ring. Pressurized air may be provided into the interior of the base so that it may flow through the tube and out the holes. With the ring configured with the tube in the area of the holes, the pressurized air may flow out of the tube and into the ring. This will tend to balance the ring around the tube, providing lift to the ring and minimizing friction between the ring and the tube. Accordingly, the ring may rotate freely around the tube.

In another aspect of the invention, the base structure may comprise an inflatable structure that may include an airtight fabric shell with plasticized coating such as PVC. As such, the base may include an inner cavity. In addition, the base may not be an inflatable structure but may instead be somewhat rigid.

In another aspect of the invention, the structure may include a source of pressurized air, such as an air blower, and the pressurized air may be provided into the base.

In another aspect of the invention, the rotating form may comprise an inflatable structure that may include an airtight fabric shell with plasticized coating such as PVC. As such, the rotating form may include an inner cavity. In addition, the rotating form may not be an inflatable structure but may instead be somewhat rigid.

In another aspect of the invention, the base may include a rotator support structure that may include a cylindrical tube with holes in its outer circumference.

In another aspect of the invention, the rotating element may comprise an inflatable ring with an inner opening that may fit onto the rotator support structure. In addition, the ring may have holes on the inner circumference of the opening. Pressurized air may be provided to the rotator support tube that passes out the holes in its outer circumference, and with the ring configured on the tube in the area of the holes, the air may pass into the ring through the holes in its inner circumference. This may provide lift to the ring and minimize the friction between the ring and the tube so that it may rotate freely.

In another aspect of the invention, the invention may include a support rim to provide additional vertical support to the rotating ring. The support ring may be configured as a part of the rotator support section, as part of the ring, or may be a standalone component.

In another aspect of the invention, the rotator support section may be shaped as a cone. In this example, the air holes in its outer circumference may be directed upward due to the angle of the side walls.

In another aspect of the invention, the rotator support section may be shaped as a cylindrical tube with a circumferential notch. In this example, the ring may fit within the notch and may rotate freely while supported by the notch.

In another aspect of the invention, the holes in the outer circumference of the rotator support section may be directed sideways so that they may apply a sideways force to the rotating ring.

In another aspect of the invention, the rotator support section may be horizontal or in any other orientation.

In another aspect of the invention, the rotating form may include other types of shapes.

In another aspect of the invention, the apparatus and the components that make up the apparatus may be any type of shape or size.

In another aspect of the invention, the internal or external lighting may be provided to illuminate the invention.

In another aspect of the invention, audio sounds may be provided to give audio signifiers to the movement of the rotating form. In addition, other types of audio such as music may be played.

In another aspect of the invention, the various elements of the structure may be controlled by a controller. These elements may include but are not limited to the air pressure, the lights, the audio and other elements.

Other aspects of the invention are discussed herein.

DETAILED DESCRIPTION OF THE PREFERRED EMBODIMENTS

Figure 1:
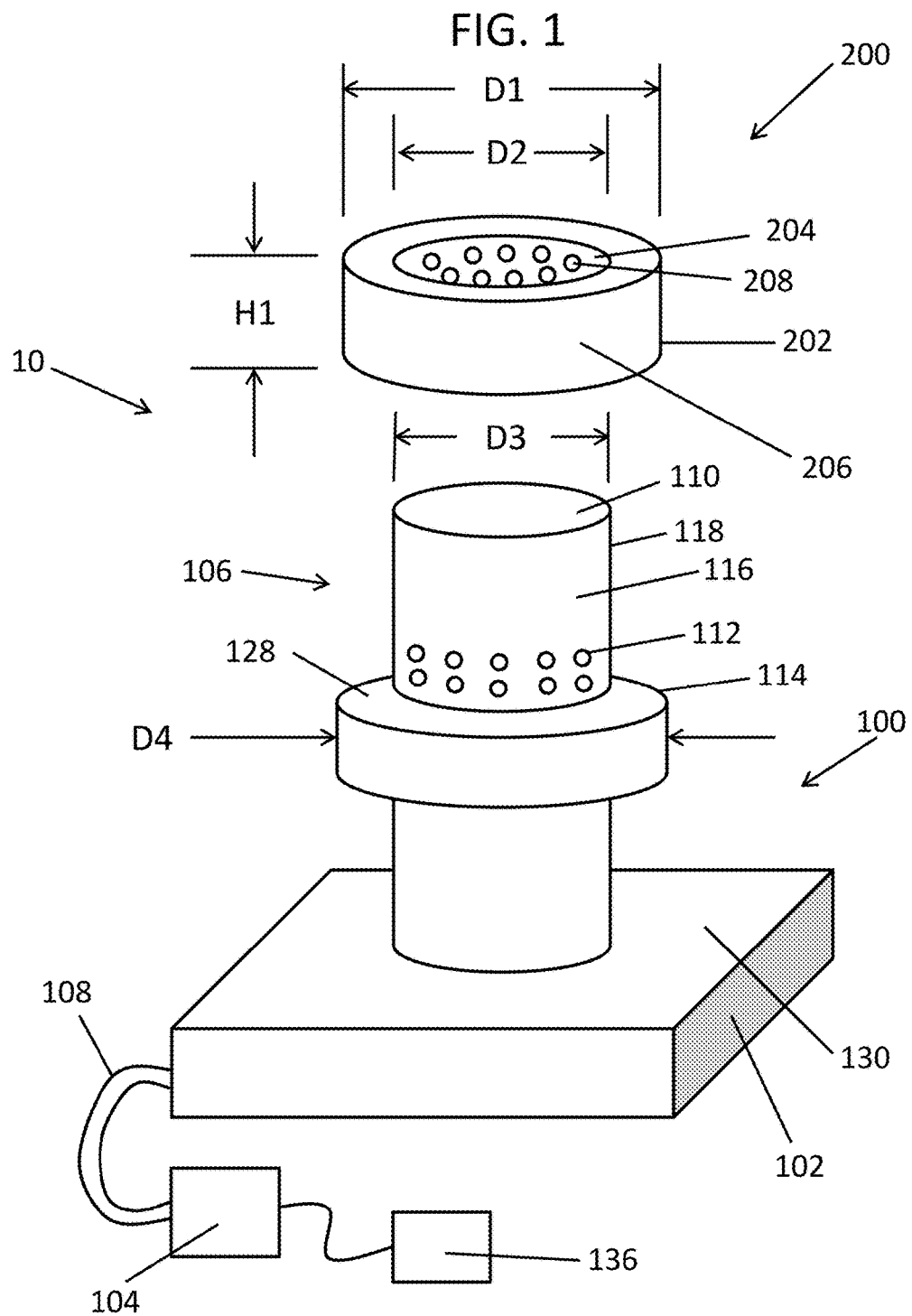
FIG. 1 is a perspective view of a rotating ring separated from the support structure.

The following detailed description is not intended to limit the current invention. Alternate embodiments and variations of the subject matter described herein will be apparent to those skilled in the art.

The apparatus 10 of the current invention and the interactive and visual effects that it may produce are now described with reference to the figures. Where the same or similar components appear in more than one figure, they are identified by the same or similar reference numerals.

In general, apparatus 10 provides interactive and aesthetic effects by providing floating and free rotating shapes. The apparatus 10 may include a shape that may float and/or rotate around an upright base, and people may play or otherwise interact with the rotating shape, or observe the rotating shape as a form of entertainment. Apparatus 10 may be installed on playgrounds, in parks, poolside, inside or outside public buildings, inside or outside hotels, at festivals, at homes for parties, or in other locations. As such, apparatus 10 may provide an attraction to these spaces and buildings. Apparatus 10 may also be included as a part of other play structures (inflatable, non-inflatable or a combination thereof), as a part of obstacle courses, as a part of a multi-structural game or as a part of other types of structures or apparatuses.

As shown in the figures, apparatus 10 may include base assembly 100 and rotating assembly 200. Additional components and/or assemblies may also be included and may be described in later sections. In general, base assembly 100 may include a rotator support section that rotating assembly 200 may fit onto. Pressurized air may be provided into base assembly 100 such that the air may pass up through the rotator support section and out through holes that may be in its outer circumference. In addition, rotating assembly 200 may have holes in its inner circumference that may receive the pressurized air passing out of the rotator support section. As the air passes out of the rotator support section and into the rotating assembly 200, the pressurized air may provide lift to rotating assembly 200. In addition, the pressurized air may also balance the rotating assembly 200 on the rotator support section such that the two structures do not come into physical contact. This may eliminate or minimize friction between the two structures. Accordingly, it can be seen that the rotating assembly 200 may freely rotate about the support section as it receives the pressurized air.

Figure 2:
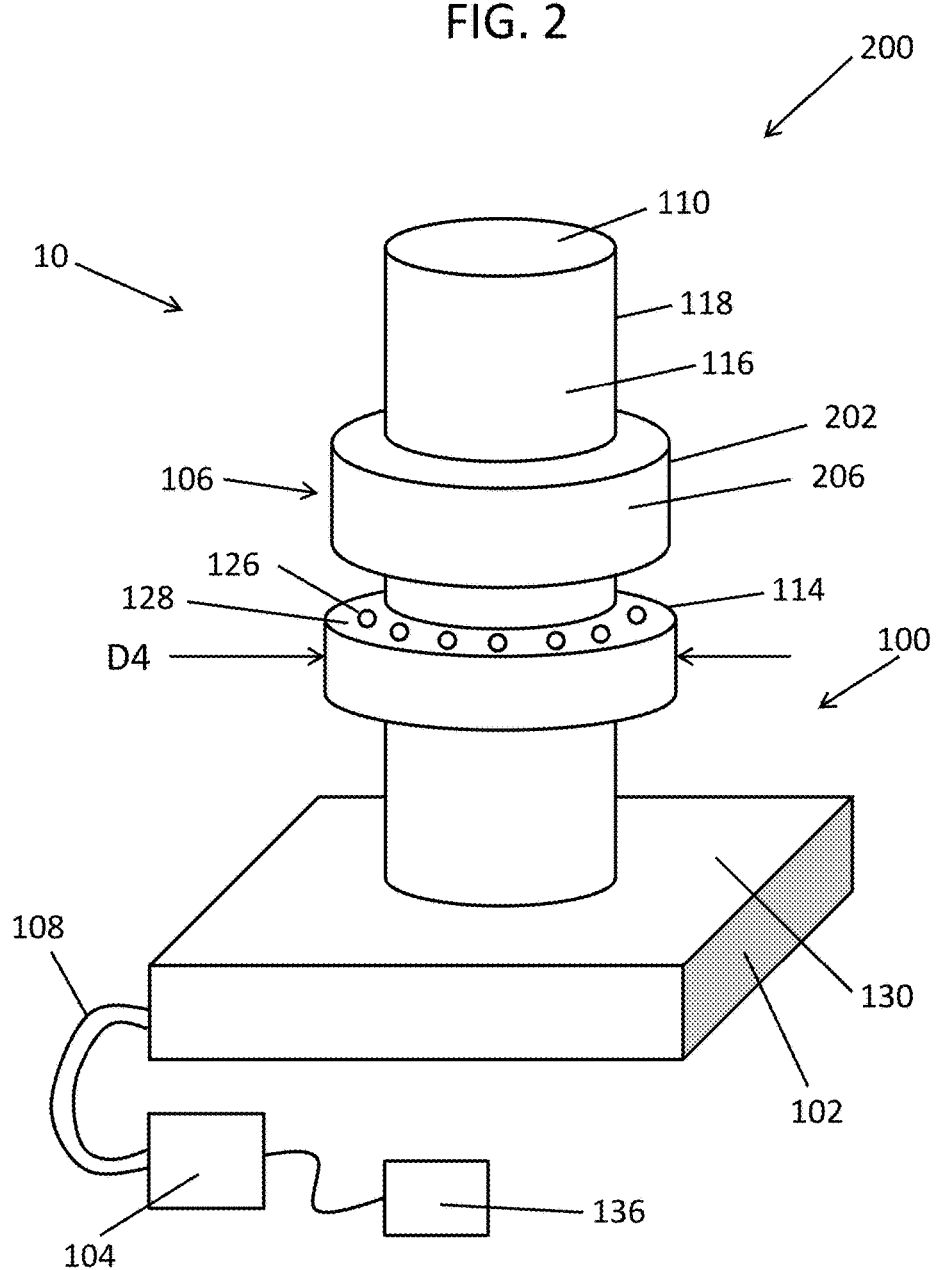
FIG. 2 is a perspective view of a rotating ring configured with the support structure.

Referring now to FIG. 1 and FIG. 2, base assembly 100 will be described in further detail. Base assembly 100 may generally include base section 102, pressurized air source 104 and rotator support section 106. Base section 102 may provide support to rotator support section 106 and may comprise any type of structure that may adequately do so. For example, base section 102 may be a free standing inflatable form, non-inflatable form, or any combination thereof, and may have an adequately large footprint to remain generally upright and stable while supporting rotator support section 106. If inflatable, base section 102 may comprise an airtight fabric shell with plasticized coating such as Polyvinyl Chloride (PVC) fabric or tarpaulin, woven oxford cloth, nylon fabric or other type of material that may or may not have a coating. As such, base section 102 may include an inner cavity that may be filled with pressurized air. Being air tight, base section 102 may receive pressurized air from pressurized air source 104 via air tube 108, and may then transfer the pressurized air to rotator support section 106 with minimal loss of air pressure. It should be noted however that base section 102 may also comprise a more rigid material (either completely rigid, semi-rigid or a combination thereof) such that it may not necessarily be an inflatable structure. In this case, base section 102 may comprise materials such as plastic, rubber, wood, metal, or other materials, and it may be preferable that base section 102 have an airtight internal cavity, tubing, bladder, diaphragm or other means to pass the pressurized air from the pressurized air source 104 to the rotator support section 106.

Pressurized air source 104 may comprise an air blower that may be powered through an electrical outlet, by battery, gas, solar, or by other sources of power. In addition, pressurized air source 104 may comprise a pressurized air tank or other source of pressurized air. It may be preferable that pressurized air source 104 have the ability to provide a continual stream of pressurized air during the use of apparatus 10 such that its operation is not disrupted. In addition, it may be preferable for pressurized air source to be controllable, either manually or through a controller or other automatic methods. This will be described in further detail in later sections. Also, while this specification may generally refers to the use of air with apparatus 10, other types of gases such as helium may also be used. It should also be noted that more than one pressurized air sources 104 of the same or various types may be used simultaneously or in combination with apparatus 10.

Pressurized air source 104 may be connected to base section 102 via inflation tube 108 or other type of gas transfer structure and it may be preferable that tube 108 and its connections with pressurized air source 104 and base section 102 be air tight and free of leaks. In this way, pressurized air may travel from pressurized air source 104 into the inside of base section 102 with minimal loss of air pressure.

Rotator support section 106 may be attached to the top surface 130, or any other surface, of base section 102, and similar to base section 102, may comprise an airtight fabric shell with plasticized coating such as Polyvinyl Chloride (PVC) fabric or tarpaulin, woven oxford cloth, nylon fabric or other type of material that may or may not have a coating. As such, rotator support section 106 may include an inner cavity or other area that may receive and contain pressurized air. In addition, there may be a hole or other type of passageway between base section 102 and rotator support section 106 such that pressurized air may pass between base section 102 and rotator support section 106. In addition, it should be noted however that rotator support section 106 may also comprise a more rigid material (either completely rigid, semi-rigid or a combination thereof) such that it may not necessarily be an inflatable structure. In this case, rotator support section 106 may comprise materials such as plastic, rubber, wood, metal, or other materials, and it may be preferable that rotator section 106 have an airtight internal cavity, tubing, bladder, diaphragm or other means to receive and contain the pressurized air from base section 102.

Rotator support section 106 may be sewn, glued or riveted to base section 102, or it may be attached using any other adequate attachment methods. In addition, it may be preferable that the junction between base section 102 and rotator support section 106 be air tight and free of leaks or holes so that the pressurized air may pass from the inside of base section 102 to the inside of rotator support section 106 with minimal loss of air pressure.

In the example depicted in FIG. 1 and FIG. 2, rotator support section 106 may generally comprise an upright cylindrical tube 118 with an outer diameter of D3, and with a base that may be attached to the top surface of base section 102, and a top that may be sealed with an air tight top cap 110. In addition, rotator support section 106 as tube 118 may include air holes 112 that pass from its inner air cavity to the outside environment located in various locations on the outer circumference of its outer wall 116. For example, air holes 112 may be located in a band around the outer circumference of tube 118 as depicted in FIG. 1, or air holes 112 may be located in any other areas or locations on tube 118. In this way, pressured air that passes from base section 102 into tube 118 may then pass out through air holes 112. Note that air holes 112 may range in diameter depending on the size and weight of the rotating assembly 200, for example, the diameter of air holes 112 may range from 5 mm to 3 cm or greater. In general, air holes 112 may be any diameter necessary to provide an adequate outflow of air for apparatus 10 to function properly as described.

In another example, rotator support section 106 may include sections of mesh material around its circumference. It is known in the art that mesh material comprises a series of holes 112 and it is therefore understood that the holes 112 in the mesh sections may be equivalent to holes 112 described above. In this way, holes 112 in the mesh sections may allow pressurized air that passes from base section 102 to tube 118 to also pass out through the mesh section. It should be noted that with a continual flow of pressurized air provided by pressurized air source 104 to base section 102, there may be a continual stream of pressurized air passing out through air holes 112 described above or through holes 112 in the mesh sections.

Rotating assembly 200 will now be described in detail with reference to FIG. 1 and FIG. 2. In the example depicted, rotating assembly 200 may generally comprise a torus, a donut-shaped form, a ring, a disk with a center cutout, or any other type of shape or form that may be configured with rotator support section 106. In the example of rotator assembly 200 comprising a ring 202 as depicted in FIG. 1 and FIG. 2, ring 202 may have an inner opening 210 with diameter D1 defined by inner wall 204, and outer diameter D2 defined by outer wall 206, and a height H1. In addition, similar to base section 102 and rotator support section 106, rotating assembly 200 may be an inflatable form, a non-inflatable form or any combination thereof. If inflatable, ring 202 may comprise an airtight fabric shell with plasticized coating such as Polyvinyl Chloride (PVC) fabric or tarpaulin, woven oxford cloth, nylon fabric or other type of material that may or may not have a coating. As such, ring 202 may include an inner cavity that may be filled with pressurized air. It should be noted however that ring 202 may also comprise a more rigid material (either completely rigid, semi-rigid or a combination thereof) such that it may not necessarily be an inflatable structure. In this case, base section 102 may comprise materials such as plastic, rubber, wood, metal, or other materials. As described in more detail in later sections, it may be preferable for rotating assembly 200 to be light in weight. It may also be preferable that it include an airtight internal cavity, tubing, bladder, diaphragm or other means to receive and contain pressurized air.

As shown in FIG. 1 and FIG. 2, rotator assembly 200 may also include air holes 208 in the inner circumference of wall 204 that pass from the outside environment into its inner cavity. The purpose of air holes 208 may be to receive pressurized air from an outside source, for example, from air holes 112 that may be located on rotator support section 106. In this way, pressurized air may pass from the outside source through air holes 208 and into rotating assembly 200. Note that air holes 208 may range in diameter depending on the size and weight of the rotating assembly 200, for example, the diameter of air holes 208 may range from 5 mm to 3 cm or greater. In general, air holes 208 may be any diameter necessary to provide an adequate outflow of air for apparatus 10 to function properly as described.

In another example, rotator assembly 200 may include sections of mesh material on its inner circumference. It is known in the art that mesh material comprises a series of holes and it is therefore understood that the holes 112 in the mesh sections may be equivalent to holes 112 described above. In this way, the holes 112 in the mesh sections may receive pressurized air from an outside source, for example, from air holes 112 that may be located on rotator support section 106.

To configure apparatus 10, rotating assembly 200 may be configured with rotator support section 106 to receive pressurized air that may pass out through air holes 112 and in through air holes 208. As shown in the example depicted in FIG. 1 and FIG. 2, rotating assembly 200 as ring 202 may be configured with rotator support section 106 as upright tube 118 by placing ring 202 onto tube 118 such that tube 118 passes though inner opening 210 of ring 202. This may result in the configuration depicted in FIG. 2. It may be preferable that the outer diameter D3 of tube 118 be slightly less than the inner diameter D1 of ring 202 such that rotating assembly 200 may fit over rotator support section 106 and the two structures may be configured concentrically. For example, it may also be preferable that D3 be smaller than D1 in the amount of 10 mm-30 mm such that with ring 202 centered on tube 118 there is an air gap of approximately 5 mm-15 mm between the two structures. However, other spacings may also be used.

Ring 202 may then be positioned such that its air holes 208 may generally align or otherwise coincide with air holes 112 on tube 118 to receive pressurized air that may be passing out of air holes 112. As the pressurized air passes out through air holes 112, in through air holes 208, and into the inner cavity of ring 202, the pressurized air may apply a force to rotating assembly 200 that may tend to lift or otherwise help to suspend rotating assembly 200 on support 106. In addition, the air streams emitted from air holes 112 may tend to balance rotating assembly 200 and keep it centered on rotator support section 106. In this way, there may be a gap of pressurized air separating the two structures and no or minimal physical contact between them. Given this, any friction between the two structures may be eliminated or minimized, and the ring 202 may rotate freely on tube 118. That is, ring 202 may be easily turned or rotated about tube 118 without significant effort or force. This may be important such that children may be able to rotate ring 202 around tube 118 without having to exert much effort.

It may be preferable that air holes 112 be evenly spaced on rotator support section 106 and around its entire outer circumference in the area that coincides with air holes 208 on ring 202. In addition, it may be preferable that air holes 208 be evenly spaced on inner wall 204 of ring 202 and around its entire inner circumference as shown. In this way, the air pressure applied to rotating assembly 200 may be symmetrical which may tend to better balance ring 202 on tube 118. In addition, the number of holes 112, 208 per unit area may vary depend on the size of ring 202 and tube 118, and it should be understood that the density of holes 112, 208 be adequate to provide enough pressurized air for apparatus 10 to function properly.

Also, air holes 112 may be angled upward as they pass through the outer wall 116 of tube 118. In this way, the pressurized air streams emitted from air holes 112 may also be directed upward such that they may vectorially apply an upward force to ring 202. This upward force may increase the lift provided to ring 202 such that it may more easily rotate on tube 118.

In addition, tube 118 may include support rim 114 that may provide additional vertical support to rotating ring 202. As depicted in FIGS. 1 and 2, support rim 114 may be in the form of a ring or other shape that may be configured around the outer circumference of tube 118 below the band of air holes 112. Support rim 114 may be configured in an even horizontal configuration so that its top surface may be generally horizontal. In addition, the outer diameter D4 of rim 114 may be larger than the inner diameter D1 of ring 202 such that ring 202 may not pass over rim 114. In this configuration, support rim 114 may act as a vertical stop to rotating assembly 200. Note also that support rim 114 may not be a complete ring but may comprise different sections or shapes that may adequately provide vertical support to ring 202.

It can be seen that in this configuration and with pressurized air applied to base assembly 100 as described above, ring 202 may be generally suspended on upright tube 118 by the pressurized air and by support rim 114 (as necessary). In addition, with the air gap between tube 118 and ring 202 maintained by the pressurized air emitting from air holes 208, there may be minimal physical contact between inner wall 204 of rotating assembly 200 and outer wall 116 of the rotator support 106, and therefore minimal friction in this area. Accordingly, it can also be seen that with enough air pressure applied to base assembly 100 rotating assembly 200 may freely rotate about rotator support section 106. That is, ring 202 may be easily turned or rotated about tube 118 without significant effort or force.

If friction exists between the top of support rim 114 and the bottom of ring 202 in this configuration, it may be minimized by including air holes 126 in the top surface 128 of rim 114 (as depicted in FIG. 2), and a passageway between tube 118 and rim 118 for pressurized air to flow. In this way, pressurized air may emit upward from air holes 126 and may apply an upward force to the bottom surface of ring 202 that may suspend ring 202 above rim 118. This may remove or minimize physical contact between the two structures thereby further minimizing any friction.

Figure 3:
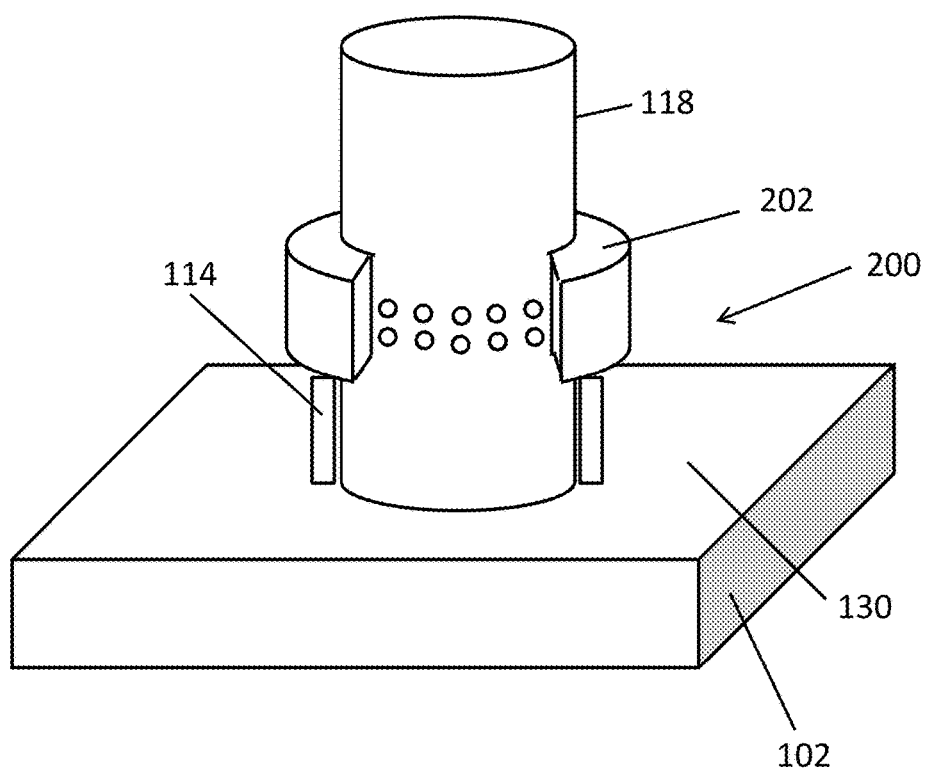
FIG. 3 is a perspective view of a rotating ring with a cutout and a lower support rim.

In addition, support rim 114 may not be fixedly attached to tube 118, but may instead be attached to ring 202 or may be free standing. If attached to ring 202, it may be configured with the bottom surface of ring 202 such that it may extend downward from the bottom of ring 202 as depicted in FIG. 3. It may be preferable that in this configuration that rim 114 be tall enough to extend downward from the bottom of ring 202 to the top surface 130 of base section 102 in order to provide the desired spacing between ring 202 and base section 102. Also, rim 114 may be a stand-alone structure, such as a ring, that may be configured around tube 118 in the area beneath ring 202 in order to provide support to ring 202.

Figure 4:
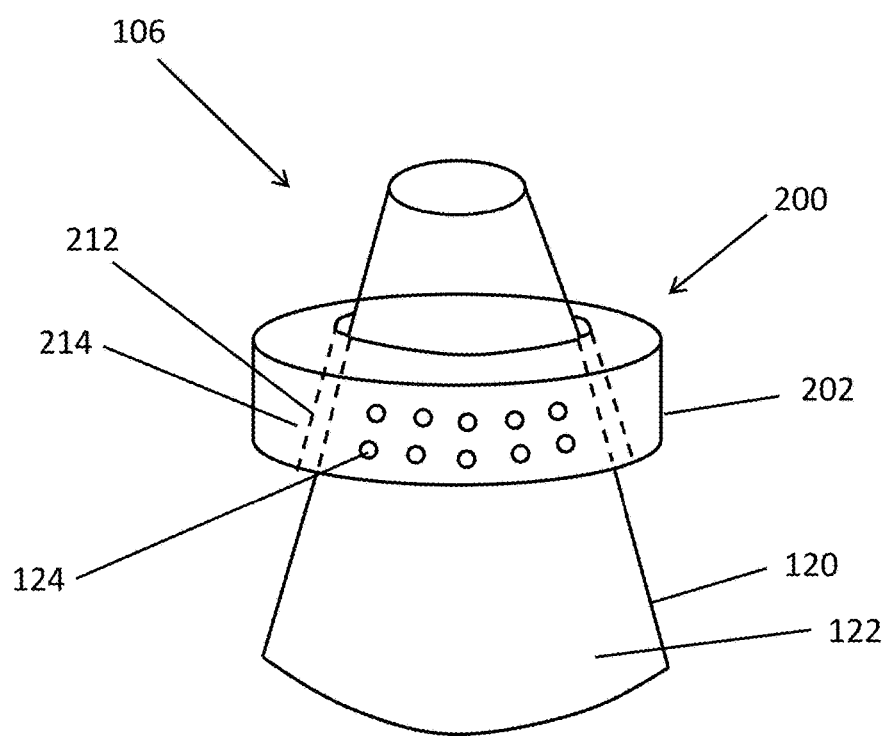
FIG. 4 is a perspective view of a rotating ring configured with a support structure in the shape of a cone.

In another example of apparatus 10, rotator support section 106 may be generally shaped as cone 120 as depicted in FIG. 4. In addition, rotating assembly 200 as ring 202 may include angled inner wall 212 (shown as a dashed line in FIG. 4) that preferably is configured at an angle that coincides with the angle of outer wall 122 of cone 120. In this way, ring 202 with angled inner wall 212 may fit onto cone 120 and inner wall 212 of ring 202 and outer wall of cone 120 may be generally parallel at any given cross section of cone 120 and ring 202.

In addition, similar to tube 118, cone 120 may include air holes 124 evenly positioned around its outside circumference on outer wall 122 that may be configured in bands or in other formations that may coincide with ring 202 when ring 202 is configured with cone 120. Also, ring 202 may include air holes 214 (represented by the gaps between the dashed line in FIG. 4) in angled inner wall 212 that may receive pressurized air that may emit from air holes 124 when the structures are configured together. It should be noted that the details and descriptions in previous sections regarding tube 118 and ring 202 may also apply to cone 120 and ring 202 with angled wall 212.

However, it can be seen that in this example, air holes 124 on cone 120 may be directed upward due to the angled side wall 122 of the cone 120. Accordingly, air streams that may emit from air holes 124 may also be generally directed upward at the same angle. Therefore, with ring 202 configured with cone 120 and with air holes 124 and air holes 214 generally aligned, pressurized air may pass into ring 202 at an upward angle. Vectorially speaking, this may result in an upward force applied to ring 202 such that it may float or be generally suspended on cone 120. With a constant steam of air passing out of cone 120 and into ring 202, ring 202 may not come into physical contact with cone 120, but instead, may be slightly separated from cone 120 by a gap of pressurized air. In this configuration, ring 202 may be free to easily rotate about cone 120 with very little additional force.

It can also be seen that because of the conical shape of rotator support section 106 in this example, its diameter may not be constant and may get larger from top to bottom. Therefore, it may be preferable that the diameter of cone 120 at some point along its body be larger than the inner diameter of ring 202 such that the larger diameter of cone 120 may act as a stop to ring 202 at this location.

Figure 5:
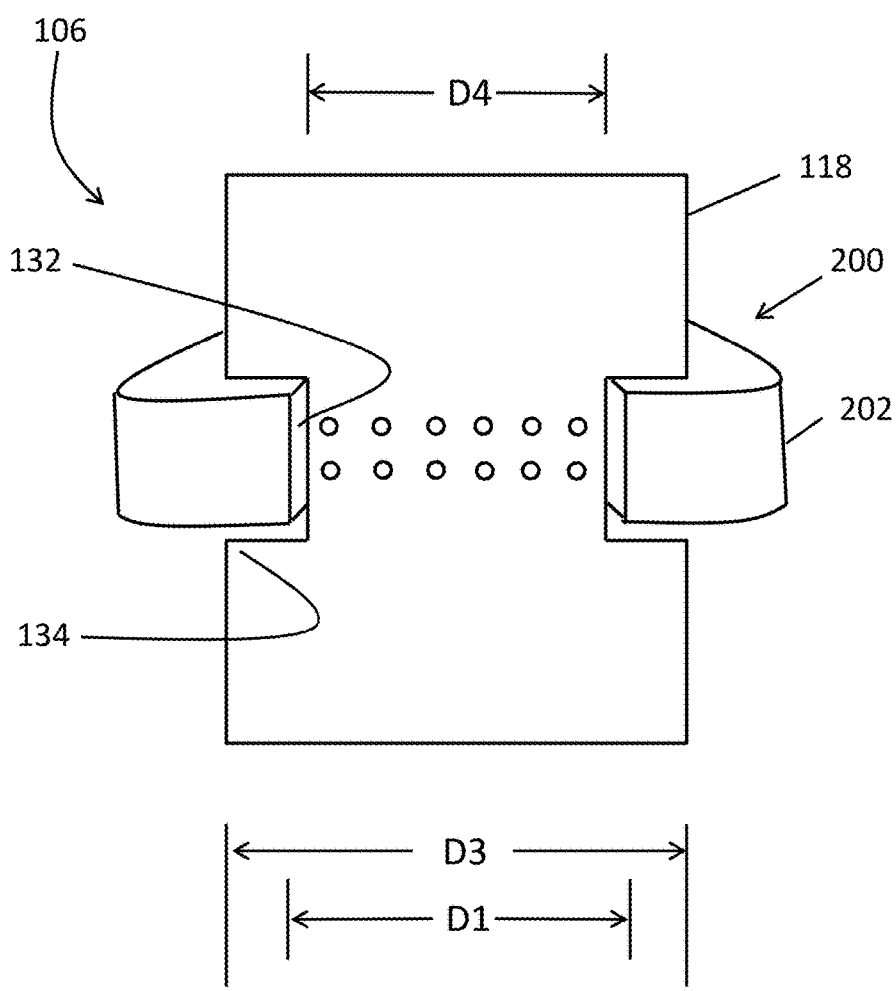
FIG. 5 is a perspective view of a rotating ring with a cutout configured with a support structure in the shape of a tube with a circumferential notch.

As shown in FIG. 5, tube 118 may also include circumferential notch 132 that may receive ring 202. The inner diameter D4 of notch 132 may be less than the inner diameter D1 of ring 202, and the outer diameter D3 of tube 118 may be greater than the inner diameter D1 of ring 202. In this way, ring 202 may fit within circumferential notch 132 and be supported by the bottom surface 134 of the notch 132. It should be noted that the details and descriptions in previous sections regarding tube 118 and ring 202 may also apply to tube 118 with notch 132 configured with ring 202.

In addition, in all of the examples above, holes 112, 124 may be configured to point sideways through outer wall 116, 122 such that the pressurized air streams that are emitted through the holes 112, 124 may also be directed sideways. If all or some of the holes 112, 124 contained within a single band or formation around rotator support section 106 are pointed sideways in the general same direction, a sideways force may be applied to rotating assembly 200 by the sideways streams of air such that rotating assembly 200 may rotate due to this force applied. In this example, the pressurized air provided by pressurized air source 104 may be controlled and/or varied in order to speed up or slow down the rotation of the rotating assembly 200 as desired. In general, holes 112, 124 may be directed in any direction in order to apply forces in any direction to rotating assembly 200.

It should be noted that in all of the examples above, rotator support section 106 may not necessarily be vertical or generally upright. Instead, rotator support section 106 may be horizontal, at an angle, or in any other orientation. In an example of rotator support section 106 being horizontal, rotator assembly 200 may be in the form of ring 202 and may be configured to spin upright on rotator support section 106 similar to the wheels on an automobile. In addition, while the above examples depict one rotating assembly 200 configured with one rotator support section 106, any number of rotating assemblies 200 may be configured with any number of rotator support sections 106. For example, several rings 202 may be configured on tube 118 with rings 202 stacked on top of one another, and with each ring 202 receiving pressurized air through air holes 112 in tube 118. In this way, rings 202 may be suspended and free to rotate in opposite directions compared to each other. Also, tube 118 may include multiple and additional bands or formations of air holes 112 such that ring 202 may be configured with any of the formations. For example, tube 118 may include three different bands of air holes 112 around its outer circumference spaced a distance apart, and ring 202 may be moved to interact with any of the bands of holes 112 separately. This may be a part of a game or other type of interactive display for children to play with.

Figure 6A:
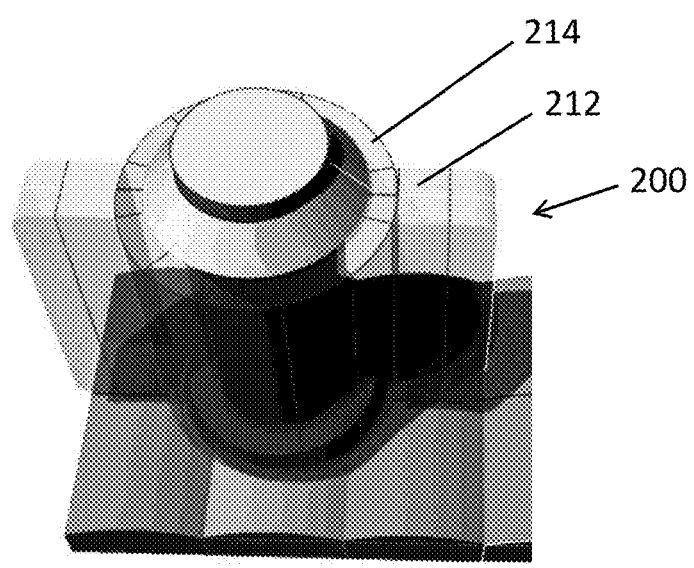
FIG. 6A is a perspective view of a rotating barrel with wings configured with a support structure.
Figure 6B:
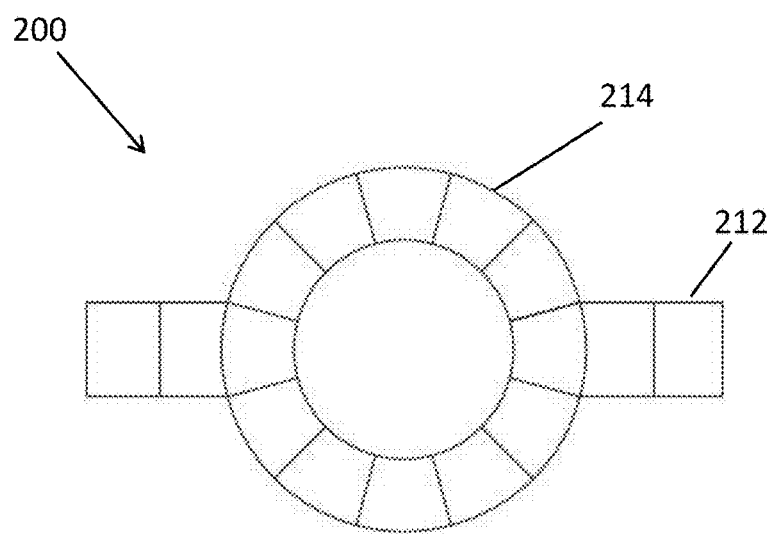
FIG. 6B is a top view of a rotating barrel with wings.

In addition, it should be noted that rotating assembly 200 may include other types of shapes other than rings. It may be preferable that rotating assembly 200 include a circular cutout with diameter D1 in order to be configured with rotator support section 106 as described above, but it may have an overall form that includes any type of different shape, form or size. For example, rotator assembly 200 may comprise a barrel shape 214 with wings 212 as depicted in FIG. 6A and FIG. 6B. In this example, apparatus may be a rotating gate as part of a larger inflatable attraction feature. In other examples, the rotating assembly 200 may take the form of animals such as tigers or bears, may be formed as characters from a movie, book or television show, may be formed as rocket ships or cars, or may be simple forms such as pyramids or spheres. It can be seen that rotating assembly may be of any form, shape or size.

Also, note that apparatus 10 and its various components and assemblies may be any shape or size, or combination of different shapes and sizes. For example, apparatus 10 may include a base section 102 that may be a rectangular shape one meter high, five meters wide and seven meters long. In this example, apparatus may also include a rotator support section 106 in the form of tube 118 attached to the base section 102 that may be two meters tall and one-half meters in diameter, and a rotator assembly 200 that may be a ring 202 that is one and one-half meters tall and one meter in diameter. In another example, base section 102 may be a circular disk that may be three meters (approximately ten feet) in diameter and one meter (approximately three feet) tall. In yet another example, base section 102 and rotator support sections 106 may be a combination of any types of shapes of various sizes and may be integrated into a play structure, a bouncy house, an obstacle course, or other type of attraction that people may be able to touch and otherwise interact with.

In another example, apparatus 10 may be used for viewing as a form of entertainment. In one example of this type, apparatus 10 may be a statue or other form of art that may have various rotating assemblies 200 rotating freely as part of the artistic structure.

Lighting may also be integrated with apparatus 10 and may be configured within the various assemblies and components of apparatus 10 or outside apparatus 10. If lights are configured within apparatus 10, it may be preferable for the shell of apparatus 10 to be translucent, clear, opaque or similar so that the light may shine through the shell and be visible to viewers from the outside. The lights may be LEDs or other types of light sources and may be contained within safe packages within apparatus 10. In addition, audio sounds may also be integrated with apparatus 10 such that as rotating assembly rotates or otherwise is moved, sounds may be emitted that coincide with the rotating assembly's movement. Sensors may be placed on apparatus 10 that may sense the motion to trigger the sound effects. This may add additional entertainment value to the structure as a part of game or other activity.

In all of the examples above, the pressurized air, lighting, sounds and other elements of apparatus 10 may be remotely controlled by a controller 136 such as a computer, a phone, a tablet, or other type of controller as shown in FIG. 1 and FIG. 2. In this way, the elements of apparatus 10 may be choreographed and controlled to form a display of moving rotating assemblies, lights, sounds and other elements. For example, the pressurized air from pressurized air source 104 may be varied from a low pressure (during which the rotating assembly may be more difficult to rotate) to a higher pressure (during which the rotating assembly may be very easy to rotate). This may be a part of a game or other type of activity that includes different levels of force necessary to rotate the rotating form 200. In addition, controller 136 may include software for automated control of apparatus 10, may be controlled manually, or may provide a combination of automated and manual control to apparatus 10.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. An apparatus, comprising:
   a base with an inner cavity, an outer surface, and at least one hole that passes from the inner cavity through the outer surface;
   a form with an inner opening and an inner surface, and with at least one hole that passes through the inner surface, wherein at least a portion of the base extends into at least a portion of the inner opening; and
   pressurized air passing into the inner cavity, out the holes through the outer surface and into the holes in the inner surface.

2. The apparatus of claim 1, wherein the form is configured to rotate freely about the at least a portion of the base.

3. The apparatus of claim 2, further comprising a rim configured to support the form as it rotates.

4. The apparatus of claim 1, wherein the form is inflatable.

5. The apparatus of claim 1, wherein the base is a cylindrical tube.

6. The apparatus of claim 1, wherein the form is a ring.

7. The apparatus of claim 1, wherein the base is a cone.

8. An apparatus, comprising:
   a base with an inner cavity, an outer surface, and holes that pass from the inner cavity through the outer surface;
   a form configured with the base and with an inner opening and an inner surface, and with holes that pass through the inner surface; and
   pressurized air passing into the inner cavity, out the holes through the outer surface and into the holes in the inner surface;
   wherein the base is a cylindrical tube with a circumferential notch.

9. The apparatus of claim 8, wherein the form is a ring that rotates within the notch.

10. An apparatus, comprising:
    a cylindrical tube with an inner cavity, an outer surface, and holes that pass from the inner cavity through the outer surface;
    an inflatable ring configured with the cylindrical tube and with an inner opening and an inner surface, and with holes that pass through the inner surface; and
    pressurized air passing into the inner cavity, out the holes through the outer surface and into the holes in the inner surface;
    wherein the form is configured to rotate freely about the circumference of the cylindrical tube.

11. The apparatus of claim 10, further comprising a rim configured to support the ring as it rotates.

12. The apparatus of claim 10, wherein the pressurized air is provided by an air blower.

* * * * *